US 11,262,909 B2

(12) United States Patent
Ebadat et al.

(10) Patent No.: US 11,262,909 B2
(45) Date of Patent: Mar. 1, 2022

(54) SYSTEM AND METHOD FOR INPUT RECOGNITION LINGUISTIC RESOURCE MANAGEMENT

(71) Applicant: MyScript, Nantes (FR)

(72) Inventors: Ali Reza Ebadat, Nantes (FR); Lois Rigouste, Nantes (FR)

(73) Assignee: MYSCRIPT, Nantes (FR)

( * ) Notice: Subject to any disclaimer, the term of this patent is extended or adjusted under 35 U.S.C. 154(b) by 0 days.

(21) Appl. No.: 15/215,751

(22) Filed: Jul. 21, 2016

(65) Prior Publication Data
US 2017/0351420 A1 Dec. 7, 2017

(30) Foreign Application Priority Data
Jun. 2, 2016 (EP) .................................. 16290099

(51) Int. Cl.
*G06F 3/0488* (2013.01)
*G06F 3/023* (2006.01)
(Continued)

(52) U.S. Cl.
CPC ........ *G06F 3/04883* (2013.01); *G06F 3/0233* (2013.01); *G06F 3/0237* (2013.01);
(Continued)

(58) Field of Classification Search
CPC .............. G06F 3/04883; G06F 3/0233; G06F 2203/0381; G06F 3/04886
See application file for complete search history.

(56) References Cited

U.S. PATENT DOCUMENTS 5,748,974 A  5/1998  Johnson
6,661,920 B1  12/2003  Skinner
(Continued)

FOREIGN PATENT DOCUMENTS

| CN | 102109954 | 6/2011 |
|---|---|---|
| WO | 2013017045 | 2/2013 |
| WO | 2014045414 | 3/2014 |

OTHER PUBLICATIONS

Johnston, "Unification-based Multimodal Parsing," Center for Human Computer Communication, Department of Computer Science and Engineering, Oregon Graduate Institute, 1998, pp. 624-630.
(Continued)

*Primary Examiner* — Asher D Kells
(74) *Attorney, Agent, or Firm* — McDermott Will & Emery LLP

(57) ABSTRACT

A system, method and computer program product for use in providing a linguistic resource for input recognition of multiple input types on a computing device are provided. The computing device is connected to an input interface. A user is able to provide input by applying pressure to or gesturing above the input interface using a finger or an instrument such as a stylus or pen. The computing device has an input management system for recognizing the input. The input management system is configured to allow setting, in the computing device memory, parameters of a linguistic resource for a language model of one or more languages, and cause recognition of input to the input interface of the different input types using the linguistic resource. The resource parameters are set to optimize recognition performance characteristics of each input type while providing the linguistic resource with the pre-determined size.

12 Claims, 11 Drawing Sheets

(51) Int. Cl.
*G06F 40/274* (2020.01)
*G06F 3/04883* (2022.01)
*G06F 3/04886* (2022.01)

(52) U.S. Cl.
CPC ........ *G06F 3/04886* (2013.01); *G06F 40/274* (2020.01); *G06F 2203/0381* (2013.01)

(56) References Cited

U.S. PATENT DOCUMENTS

| | | | |
|---|---|---|---|
| 6,788,815 | B2 | 9/2004 | Lui et al. |
| 6,865,528 | B1 | 3/2005 | Huang et al. |
| 6,868,383 | B1 | 3/2005 | Bangalore et al. |
| 6,904,405 | B2 | 6/2005 | Suominen |
| 7,031,908 | B1 | 4/2006 | Huang et al. |
| 7,454,344 | B2 | 11/2008 | Ramsey |
| 7,496,513 | B2 | 2/2009 | Soong et al. |
| 7,848,917 | B2 | 12/2010 | Soong et al. |
| 8,209,178 | B1 * | 6/2012 | Talbot ................ G06F 17/2715 704/254 |
| 8,600,746 | B1 * | 12/2013 | Lei ......................... G10L 15/22 704/235 |
| 2005/0234722 | A1 | 10/2005 | Robinson et al. |
| 2006/0036428 | A1 * | 2/2006 | Ramsey ............. G06F 17/2705 704/9 |
| 2008/0266263 | A1 | 10/2008 | Motaparti et al. |
| 2013/0120274 | A1 * | 5/2013 | Ha ........................ G06F 3/0488 345/168 |
| 2014/0098024 | A1 | 4/2014 | Paek et al. |
| 2014/0297267 | A1 * | 10/2014 | Spencer ................ G06F 40/274 704/9 |
| 2016/0275946 | A1 * | 9/2016 | Caseiro ............... G06F 17/2715 |

OTHER PUBLICATIONS

International Search Report issued for PCT/EP2017/000653 dated Aug. 31, 2017 (5 pages).
Written Opinion of the International Searching Authority issued for PCT/EP2017/000653 dated Aug. 31, 2017 (8 pages).
"N-Gram and N-Class Models for on line Handwriting Recognition", 2003, Freddy Perraud et al., Proceedings of the Seventh Int'l Conference on Document Analysis and Recognition (ICDAR '03), pp. 1053-1057.

* cited by examiner

SYSTEM AND METHOD FOR INPUT RECOGNITION LINGUISTIC RESOURCE MANAGEMENT

CROSS-REFERENCE TO RELATED APPLICATIONS

This application claims priority to European Application No. 16290099.7 filed on Jun. 2, 2016, the entire contents of which are incorporated herein.

TECHNICAL FIELD

The present description relates generally to the field of computer input systems and methods using computing device interfaces. The present description relates more specifically to systems and methods for multi-modal input of typing and handwriting via a user interface for recognition.

BACKGROUND

Computing devices continue to become more ubiquitous to daily life. They take the form of computer desktops, laptop computers, tablet computers, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. A further input device is a position detection system which detects the relative position of either touch or non-touch interactions with a non-touch physical or virtual surface. Any of these methods of input can be used generally for input through interaction with a displayed (virtual) keyboard or through drawing or writing. When user input is drawn or written, the user's handwriting is typically interpreted using a handwriting recognition system or method.

Virtual or 'soft' keyboards are widely used now and many options and applications beyond those that come standard with portable (and non-portable) computing devices are available, particularly for complex languages, such as those having many characters beyond those easily placed on a single keyboard panel or layout, and for non-text characters, such as numbers, symbols and messaging characters (e.g., emoticons or "emojis").

The use of virtual keyboards is generally suited for input environments where users are able to concentrate on the input tool and what they are entering therewith. Due to the portability of modern devices and use of many different devices by users, there is a growing need to allow input (of content in particular) in many environments, some of which are not conducive to allowing such concentration. For example, many users of portable devices, such as smartphones, input content whilst walking causing difficulty for typing whilst viewing the device screen, or in automobiles users cannot view an input surface whilst driving. Such content input situations could be handled with voice input, for example. However, many environments do not allow effective use of voice input, such as in noisy or intrinsically quiet situations or situations in which users do not wish to be overheard.

There are many applications of handwriting recognition in portable computing devices, such as smartphones, phablets and tablets, such as is in note taking, document annotation, mathematical equation input and calculation, music symbol input, sketching and drawing, etc. Handwriting may also be input to non-portable computing devices, particularly with the increasing availability of touchscreen monitors for desktop computers and interactive whiteboards. These types of input are usually performed by the user launching a handwriting input application on the computing device which accepts and interprets, either locally in the device or remotely via a communications link of the device, handwritten input on the touch sensitive surface and displays or otherwise renders this input as so-called 'digital ink'.

It may be possible to use such handwriting input in place of keyboards on such devices in order to allow special character input or input in conditions non-conducive to typing as handwriting can generally be performed without looking. However, the Applicant has found that users do not like using handwriting extensively on electronic devices, particular those with smaller screens, such as smartphones and phablets, particularly when a relatively large amount of content is to be input, e.g., the writing of an email message versus a TWITTER® message.

Alternatively, handwriting could be used to supplement keyboard input by providing relatively fast input of at least a few text and non-text characters, particularly those that are not present on initial keyboard panels. Such a combination of keyboard and handwriting input also aides the above mobile input scenarios, such as when content input is begun in an environment conducive to typing (and voice), such as on a desktop or laptop PC in an office, and then continued in a non-conducive environment, such as in a vehicle, like a car or airplane.

Such multiple entry systems have been proposed. For example, U.S. Pat. No. 6,661,920 describes a system for accepting input from keyboard and handwriting. U.S. Pat. No. 6,788,815 describes a system for accepting input from keyboard and handwriting, and from speech. Such proposed systems utilize keyboard entry and handwriting recognition in a collocated fashion. That is, typing via the keyboard is decoded using well-known methods, such as fuzzy logic, and handwriting via a handwriting panel, for example, is recognized using well-known methods, such as using lexica and language models.

There is a growing popularity of keyboards which accept stroke-like input as well, such as the SWYPE®, SWIFTKEY® and TOUCHPAL® keyboards. The stroked 'keying' on such keyboards may be recognized by tracking the stroke path relative to the virtual keys and using the fuzzy techniques of 'key' typing, see for example U.S. Pat. Nos. 7,250,938, 7,750,891 and 8,667,414, or using lexica and language models, like handwriting recognition, see for example U.S. Pat. Nos. 8,843,845 and 9,182,831.

Such linguistic techniques using lexica and language models may also be used for providing word prediction and completion capabilities for typing. For example, U.S. Patent Application Publication No. 2008/0266263 describes a collocated system in which keyboard input is recognized using linguistic techniques at a character level and handwriting input is recognized at character level only without using linguistic resources. U.S. Pat. No. 7,848,917 describes a collocated system in which reduced keyboard and handwriting input are recognized using dedicated linguistic techniques.

Accordingly, following the collocation approach of the conventional multi-modal input systems, it is possible to provide a multi-modal input system of key typing, stroke typing and handwriting, for example, which employs decoding or linguistic techniques for key typing, and separate dedicated linguistic resources for stroke typing and handwriting recognition. However, linguistic resources typically require a relatively large amount of (memory) space because they need to be representative of typical uses of language, and therefore are at least as large as a dictionary. Even with well-known techniques for saving space, such as grouping words together that share the same statistical context (so-called N-class models), the memory space required by a collocated system may be too excessive for many applications. Further, user experience may be adversely affected due to recognition inconsistencies when switching between one input type to another.

What is needed is a multi-modal input system and method which provides a unified user experience by providing the same behavior in all modes of input for all input recognition features considered for the linguistic techniques used, such as prediction, completion, linguistic adaptation, out-of-lexicon output, etc.

SUMMARY

The examples of the present invention that are described herein below provide systems and methods for providing a linguistic resource for input recognition of multiple input types to computing devices. Each computing device is connected to an input interface and has a processor, a memory and at least one non-transitory computer readable medium for recognizing input under control of the processor.

In one example, a system for providing a linguistic resource for input recognition of multiple input types to computing devices is provided. The at least one non-transitory computer readable medium is configured to allow setting, in the memory, of a plurality of parameters of a linguistic resource which provides a language model of one or more languages and cause recognition of input to the input interface of one or more types of a plurality of different types of input in the one or more languages using the linguistic resource. The plurality of parameters are set in order to optimize performance characteristics of the recognition of each of the one or more types of recognized input while providing the linguistic resource with a pre-determined size.

The different types of input may include handwriting input and typing input. The performance characteristics may include the word recognition rate of the handwriting input, the word prediction rate of the typing input and the keystroke saving rate of the typing input.

The language model may be a class-based n-gram language model utilizing a lexicon built using one or more corpora related to the one or more languages. The plurality of parameters may include one or more of a first parameter related to the size of the lexicon, a second parameter related to the corpora content used to build the lexicon and the n-gram model, a third parameter related to the number of n-gram sequences, a fourth parameter related to the order of the n-gram model, and a fifth parameter related to the number of classes in the class-based model.

The fourth and fifth parameters may be set to optimize the word prediction rate of the typing input. The first parameter may be set to optimize the word recognition rate, the second parameter may be set to optimize the word prediction and keystroke saving rates of the typing input, and the third parameter may be set to provide the linguistic resource with the pre-determined size once the performance characteristics have been optimized.

In another example, a method for providing a linguistic resource for input recognition of multiple input types to computing devices is provided. The method includes allowing setting, in computing device memory, of a plurality of parameters of a linguistic resource which provides a language model of one or more languages, and causing recognition of input to the input interface of one or more types of a plurality of different types of input in the one or more languages using the linguistic resource. The plurality of parameters are set in order to optimize performance characteristics of the recognition of each of the one or more types of recognized input while providing the linguistic resource with a pre-determined size.

The different types of input may include handwriting input and typing input. The performance characteristics may include the word recognition rate of the handwriting input, the word prediction rate of the typing input and the keystroke saving rate of the typing input.

The language model may be a class-based n-gram language model utilizing a lexicon built using one or more corpora related to the one or more languages. The plurality of parameters may include one or more of a first parameter related to the size of the lexicon, a second parameter related to the corpora content used to build the lexicon and the n-gram model, a third parameter related to the number of n-gram sequences, a fourth parameter related to the order of the n-gram model, and a fifth parameter related to the number of classes in the class-based model.

The fourth and fifth parameters may be set to optimize the word prediction rate of the typing input. The first parameter may be set to optimize the word recognition rate, the second parameter may be set to optimize the word prediction and keystroke saving rates of the typing input, and the third parameter may be set to provide the linguistic resource with the pre-determined size once the performance characteristics have been optimized.

In another example, a non-transitory computer readable medium having a computer readable program code embodied therein, said computer readable program code adapted to be executed to implement a method for providing a linguistic resource for input recognition of multiple input types to a computing device, is provided. The method includes allowing setting, in computing device memory, of a plurality of parameters of a linguistic resource which provides a language model of one or more languages, and causing recognition of input to the input interface of one or more types of a plurality of different types of input in the one or more languages using the linguistic resource. The plurality of parameters are set in order to optimize performance characteristics of the recognition of each of the one or more types of recognized input while providing the linguistic resource with a pre-determined size.

The different types of input may include handwriting input and typing input. The performance characteristics may include the word recognition rate of the handwriting input, the word prediction rate of the typing input and the keystroke saving rate of the typing input.

The language model may be a class-based n-gram language model utilizing a lexicon built using one or more corpora related to the one or more languages. The plurality of parameters may include one or more of a first parameter related to the size of the lexicon, a second parameter related to the corpora content used to build the lexicon and the n-gram model, a third parameter related to the number of n-gram sequences, a fourth parameter related to the order of the n-gram model, and a fifth parameter related to the number of classes in the class-based model.

The fourth and fifth parameters may be set to optimize the word prediction rate of the typing input. The first parameter may be set to optimize the word recognition rate, the second parameter may be set to optimize the word prediction and keystroke saving rates of the typing input, and the third parameter may be set to provide the linguistic resource with the pre-determined size once the performance characteristics have been optimized.

BRIEF DESCRIPTION OF THE DRAWINGS

The present system and method will be more fully understood from the following detailed description of the examples thereof, taken together with the drawings. In the drawings like reference numerals depict like elements. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The use of the term 'text' in the present description is understood as encompassing all alphanumeric characters, and strings thereof, in any written language and common place non-alphanumeric characters, e.g., symbols, used in written text. Further, the term 'non-text' in the present description is understood as encompassing freeform handwritten or hand-drawn content and rendered text and image data, as well as non-alphanumeric characters, and strings thereof, and alphanumeric characters, and strings thereof, which are used in non-text contexts. Furthermore, the examples shown in these drawings are in a left-to-right written language context, and therefore any reference to positions can be adapted for written languages having different directional formats.

The systems and methods described herein may utilize recognition of users' natural writing and drawing styles input to a computing device via an input interface, such as a touch sensitive screen, connected to, or of, the computing device or via an input device, such as a digital pen or mouse, connected to the computing device or via a physical or virtual surface monitored by a position detection system.

Whilst the various examples are described with respect to recognition of handwriting input using so-called online recognition techniques, it is understood that application is possible to other forms of input for recognition, such as offline recognition in which images rather than digital ink are recognized. The terms hand-drawing and handwriting are used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye.

Figure 1:
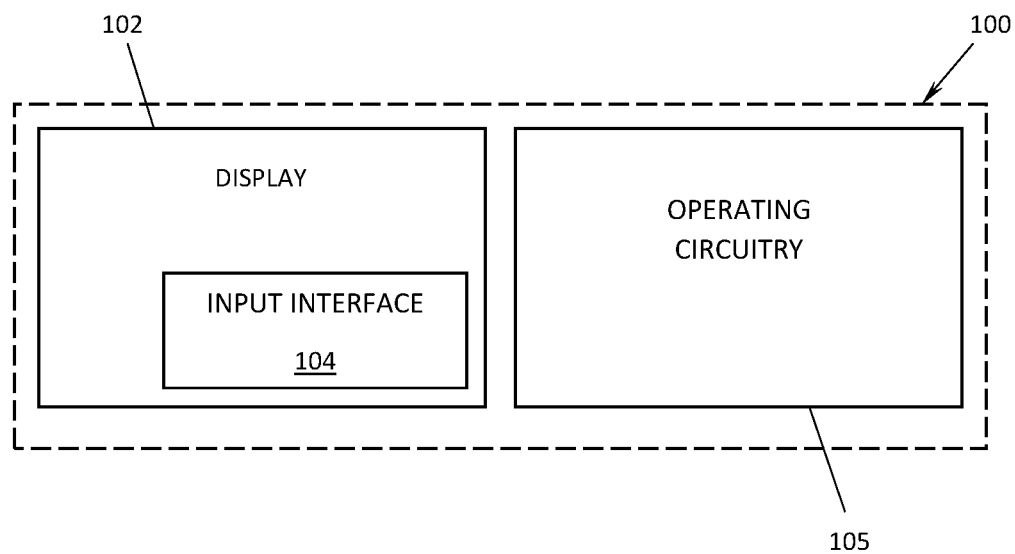
FIG. 1 shows a block diagram of a computing device in accordance with an example of the present system and method.

FIG. 1 shows a block diagram of an example computing or digital device 100. The computing device may be a computer desktop, laptop computer, tablet computer, hybrid computers (2-in-1s), e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The illustrated example of the computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. At least some of the display 102 is co-located with at least one input interface 104. The input interface 104 may be a surface employing technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input interface 104 may be bounded by a permanent or video-generated border that clearly identifies its boundaries. Instead of, or additional to, an on-board display, the computing device 100 may have a projected display capability or is able to operate with a projected display, such that the input interface is a virtual surface. Further, the display itself may be separate from and connected to the computing device.

The computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

Figure 2:
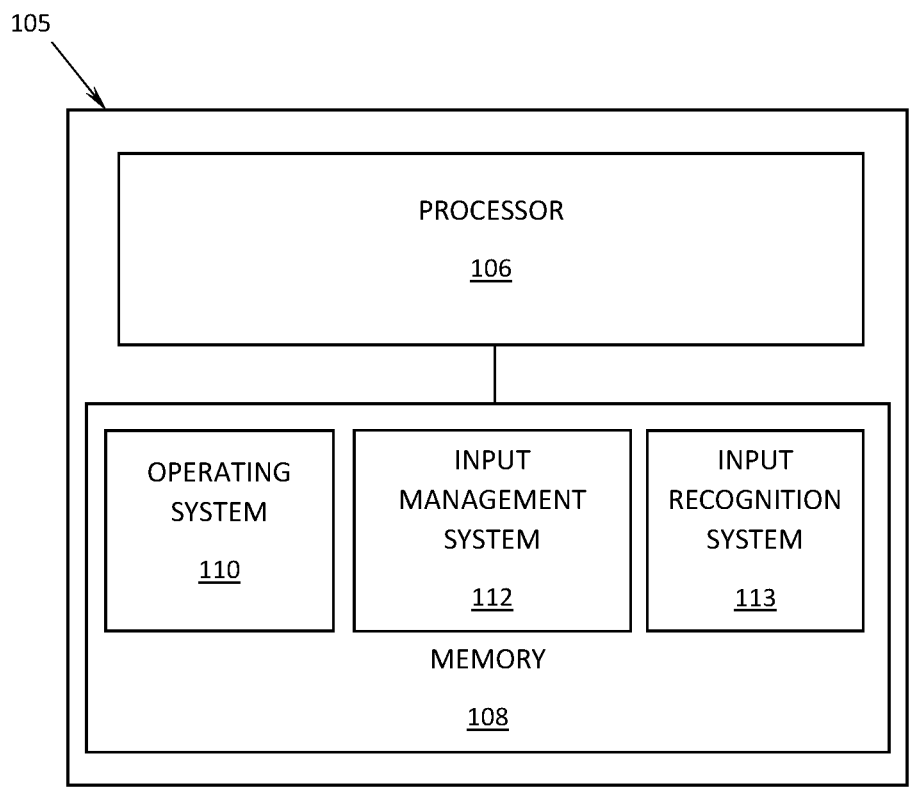
FIG. 2 shows a block diagram of example operating circuitry of the computing device.

The computing device 100 has operating circuitry 105. FIG. 2 shows a block diagram of an example of the operating circuitry 105. In this example, the operating circuitry 105 includes a processor 106, which is a hardware device for executing software, particularly software stored in a memory 108. The processor can be any custom made or commercially available general purpose processor, a central processing unit (CPU), commercially available microprocessors including a semiconductor based microprocessor (in the form of a microchip or chipset), microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art.

The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD), or any other magnetic, resistive or phase-change nonvolatile memory). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110, an input management system 112 and an input recognition system 113, which may each include one or more separate computer programs. Each of these has an ordered listing of executable instructions for implementing logical functions. The operating system 110 controls the execution of the input management system 112 and the input recognition system 113, or may incorporate the functions of these systems. The operating system 110 may be any proprietary operating system or a commercially or freely available operating system, such as WEBOS, WINDOWS®, MAC and IPHONE OS®, LINUX, and ANDROID. It is understood that other operating systems may also be utilized. Alternatively, the input management system 112 and input recognition system 113 of the present system and method may be provided without use of an operating system.

The input management system 112 includes one or more processing elements related to detection, management and treatment of user input. The software may also include one or more applications related to input recognition, different functions, or both. Some examples of other applications include a text editor, telephone dialer, contacts directory, instant messaging facility, computer-aided design (CAD) program, email program, word processing program, web browser, and camera. The input management system 112, and the applications, include program(s) provided with the computing device 100 upon manufacture and may further include programs uploaded or downloaded into the computing device 100 after manufacture.

The input management system 112 of the present system and method manages input into the computing device 100 via the input interface 104, for example. Input is managed through the provision of input tools to users and the handling of the input for processing and the like. The input tools include the provision and display of dedicated input areas on the input interface 104 or the provision of the (substantially) entire input interface 104 for the receipt of user input via interaction with or in relation to the input interface 104. The dimensions and functionality of these input areas are provided in correspondence with, and responsive to, the dimensions and orientation of the display area of the device display 102 in a manner well understood by those skilled in the art.

Figure 3:
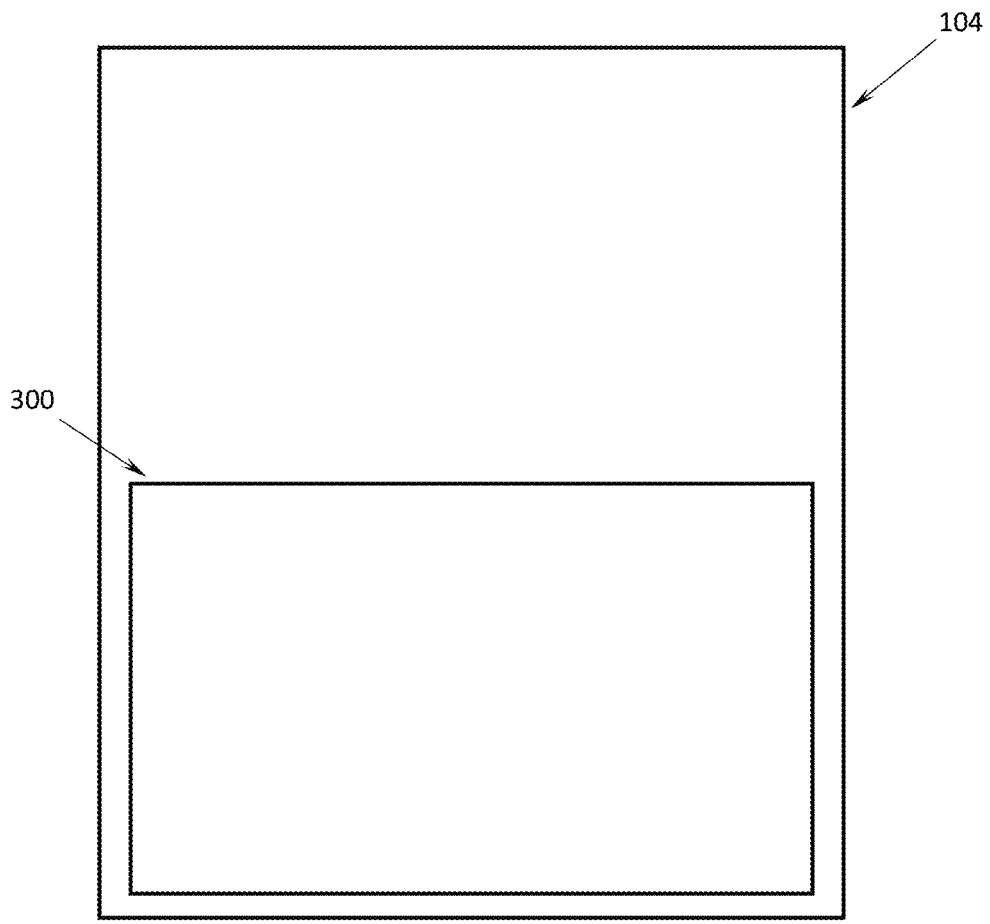
FIG. 3 shows a schematic view of an input area provided by an input management system on a portion of an input interface of the computing device in accordance with an example of the present system and method.

FIG. 3 shows an example input area 300 displayed by the input management system 112 on the input interface 104. The input area 300 is an area or zone of the display of the computing device 100 which is to be used for the input of content and/or control gestures by users. In other examples, substantially all of the input interface may be configured as the input area. Any digital device user is already accustomed to gesturing on screen to type or write content and to enter control commands for application and device navigation, content editing, etc. Such interactions with the input interface 104 of the computing device 100 are generally detected by the processor 106 and this information is communicated to the input management system 112 for interpretation and recognition processing.

Figure 4:
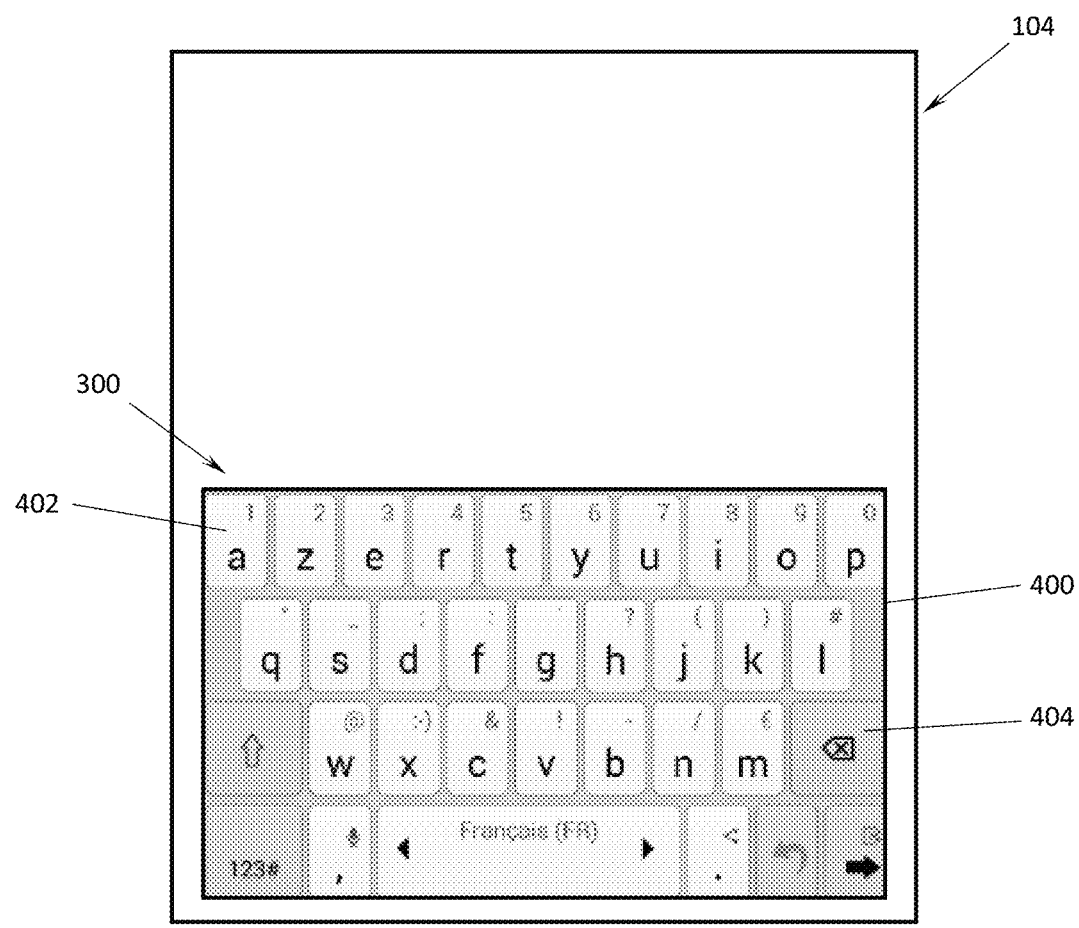
FIG. 4 shows a schematic view of an example visual rendering of a keyboard layout in the input area for receiving typing input.

The input area 300 is configured to receive user input through single-point or single-position gestures or interactions, such as tap, short and long press, multi-point or multi-position gestures or interactions, such as double tap, and stroke gestures, such as swipe. In order to translate these gestures to input of specific content or commands, a (virtual) keyboard panel 400 may be displayed in the input area 300, such as the 'azerty' style keyboard layout variant of the 'qwerty' keyboard layout shown in FIG. 4.

The illustrated layout of the keyboard panel 400 is merely an example, and many other known keyboard layouts and methods, e.g., qwerty or azerty mapped layouts for language specific variants like BoPoMoFo, Hangul, JIS, phonetic, non-qwerty layouts for different languages like Hanyu Pinyin, Jcuken, InScript, reduced keyboard, such as T9 or T12, or yet-to-be-developed keyboard layouts, are applicable to the present system and method used either singularly with respect to the computing device or selectively (discussed in detail later) by storage of different keyboard layouts in the memory 108, for example. Further, layouts that provide access to non-alphabetic characters, such as numerals, grammatical marks, emojis, etc. are also applicable, typically selectively.

As discussed, the example keyboard panel 400 includes a keyboard layout. The keyboard layout has content keys 402 which when interacted with by users, such as through a single-point gesture or 'strike' thereon or over, result in the input of content, and command keys 404 which when interacted with by users, such as through a single-point gesture or strike thereon or over, result in the input of control commands, e.g., applying a tap on the "backspace" key causes the backspacing deletion of previously input characters, or launching of keyboard sub- or dedicated layouts, e.g., special character layouts having keys for numerals, grammatical marks, emojis, language specific layouts as described above, language alternatives layouts providing access to accents, character alternatives based on strokes, etc. Both the content and command keys are generally displayed with character depictions corresponding to the content or command input which results from interaction with that key.

Users may provide input with respect to the keyboard panel using a finger or some instrument such as a pen or stylus suitable for use with the input interface. The user may also provide input by making a gesture above the input interface 104 if technology that senses or images motion in the vicinity of the input interface 104 is being used, or with a peripheral device of the computing device 100, such as a mouse or joystick, or with a projected interface, e.g., image processing of a passive plane surface to determine the input sequence and gesture signals.

The present system and method handles the user keyboard input to provide an input signal as a sequence of points that are classified as consecutive unitary key presses (e.g., key typing) or as a stroke(s) characterized by at least the stroke initiation location, the stroke termination location, and the path connecting the stroke initiation and termination locations (e.g., stroke typing) as captured by the input management system 112 and/or input recognition system 113. Further information such as timing, pressure, angle at a number of sample points along the path may also be captured to provide deeper detail of the keyboard strokes.

Figure 5:
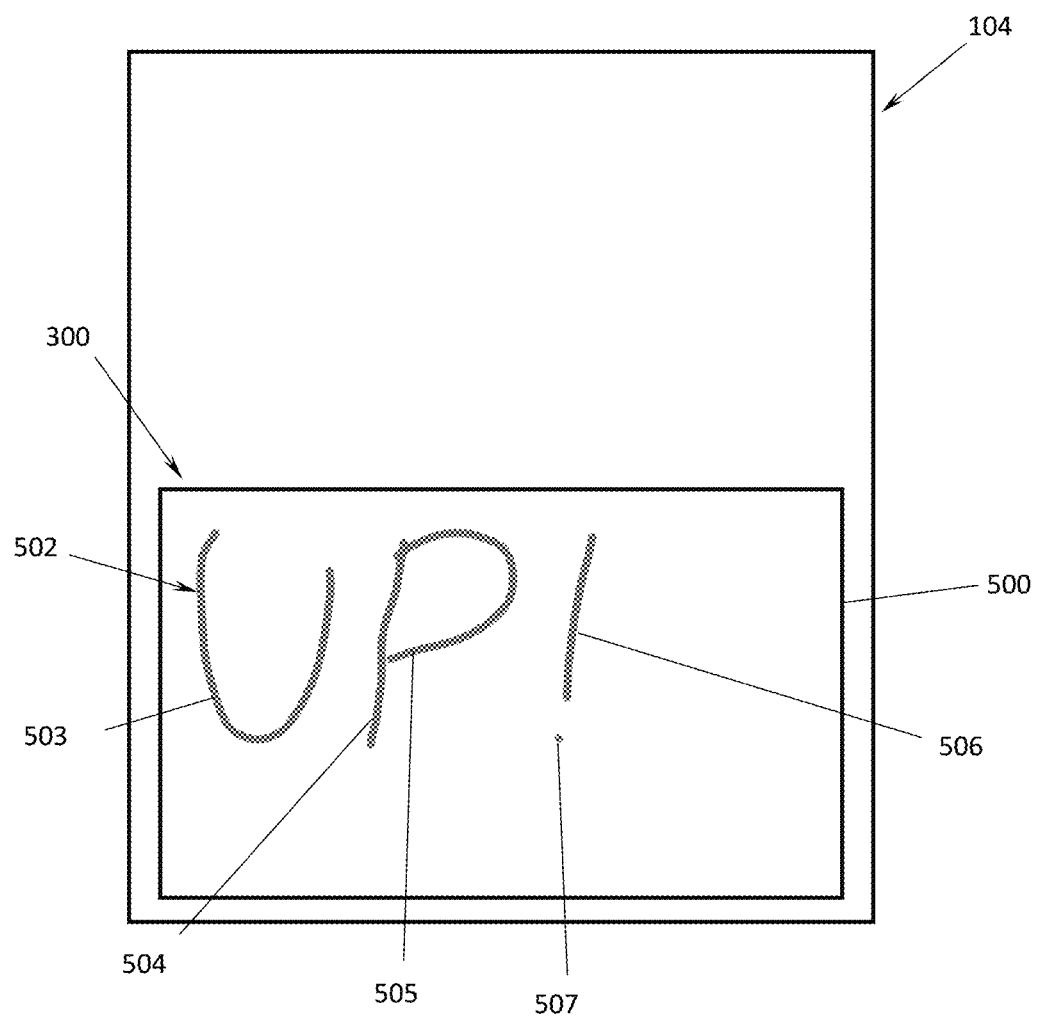
FIG. 5 shows a schematic view of an example visual rendering of a handwriting panel in the input area for receiving handwriting input as depicted.

Additionally, or alternatively, in order to translate user gestures to input of specific content or commands, a handwriting panel 500 may be displayed in the input area 300 as shown in FIG. 5. The handwriting panel 500 is configured to receive handwriting input 502 entered by handwriting on or over the handwriting panel 500. FIG. 5 shows the handwriting panel 500 with example handwriting input 502 rendered as digital ink thereon (described later). The handwriting input 502 includes multiple handwritten strokes 503 to 507 which together provide the handwriting input 502 as the word "UP" followed by an exclamation mark "!".

A user may input such handwritten strokes with a finger or some instrument such as a pen or stylus suitable for use with the input interface 104. The user may also input a stroke by making a gesture above the input interface 104 if technology that senses motions in the vicinity of the input interface 104 is being used, or with a peripheral device of the computing device 100, such as a mouse or joystick.

The present system and method handles the user handwriting input to provide the input signal as a sequence of points that are classified as a stroke(s) characterized by at least the stroke initiation location, the stroke termination location, and the path connecting the stroke initiation and termination locations as captured by the input management system 112 and/or input recognition system 113. Further information such as timing, pressure, angle at a number of sample points along the path may also be captured to provide deeper detail of the handwritten strokes.

Figure 6:
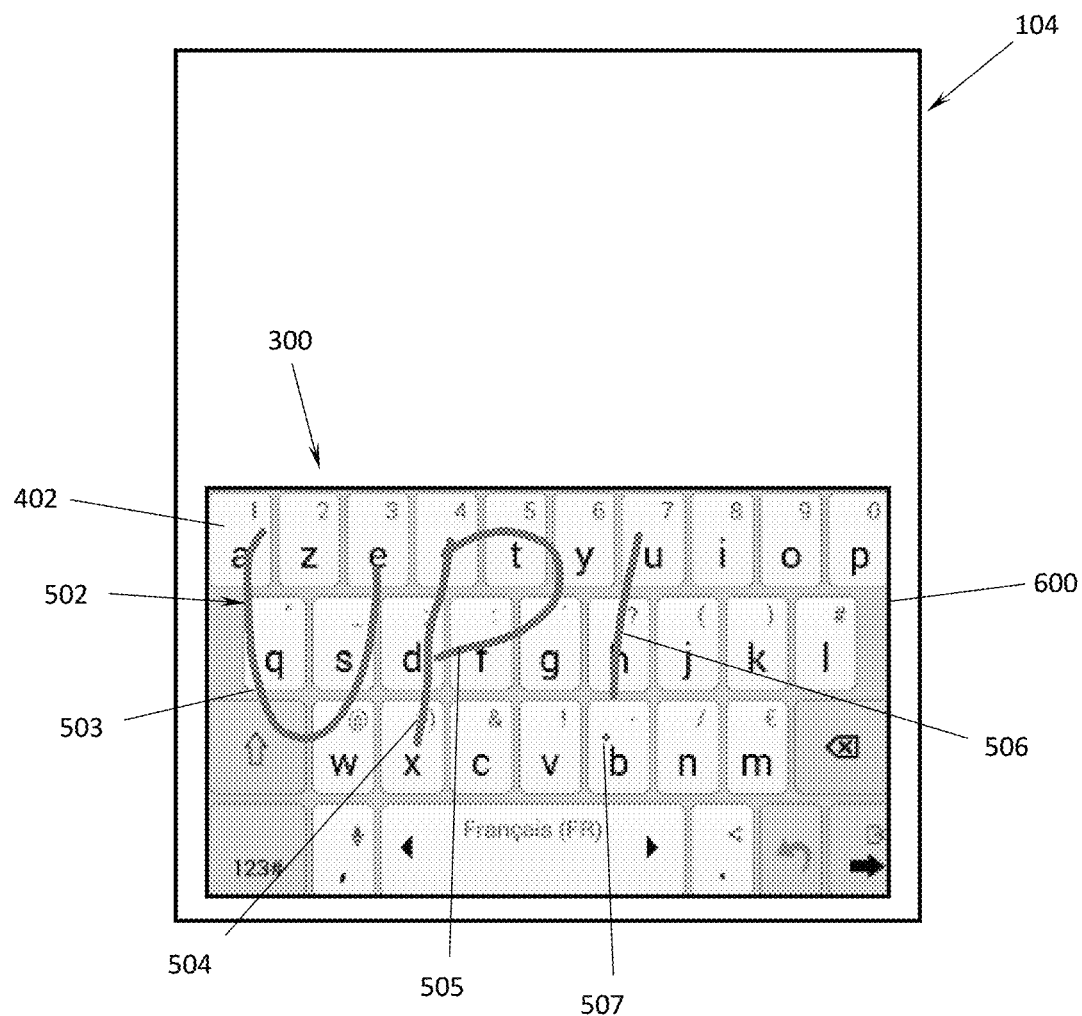
FIG. 6 shows a schematic view of an example visual rendering of an input area for receiving keyboard and handwriting input.

In another example, in order to translate user gestures to input of specific content or commands, a combined input panel 600 may be displayed in the input area 300 as shown in FIG. 6, which as shown provides a keyboard layout and accepts handwriting input. An example of the configuration and operation of such a combined or multi-modal input panel is described in U.S. patent application Ser. No. 15/132,514 titled "System and Method for Multiple Input Management" filed claiming a priority date of 2 Feb. 2016 in the name of the present Applicant and Assignee, the entire contents of which is incorporated by reference herein. With such a multi-modal input panel input management is provided which allows users to input content, such as words, parts of words, letters, symbols, figures, special characters, to a digital device using multiple input modes.

The input panel, such as the typing panel 400, the handwriting panel 500 and/or the multi-modal panel 600, may be displayed upon the receipt of certain user actions, such as the launching of an application on the computing device 100, or interaction with components of that application such as a menu, for example, for the input of content. However, the present system and method is not restricted to such a mechanism, and the input area 300 may be provided for the receipt of user input whenever and at any time the input interface 104 is active, e.g., able to accept user interaction. This is particularly the case where the input panel corresponds substantially to the entire input interface, such that user interaction with the input interface represents interaction with the input panel.

Further, while the multi-modal panel 600 allows input using the keys of the keyboard and also using handwriting strokes without input mode switching either manually, e.g., through user input of gestures or interaction with soft or hard buttons/menus, or automatically, e.g., through detection of handwriting versus 'keying' of the keyboard, for the separate keyboard and handwriting panels the input management system 112 may provide such switching for users. Further, even with the multi-modal panel 600, the input management system 112 may cause the handwriting panel 500 (and the keyboard panel 400) to be displayed individually, for example by causing display of the keyboard layout to be gradually faded out when handwriting input is detected.

The display of the different input panels may also be made in accordance with the type of input made available to users by the input management system as governed by the environment of use. This can be done for example through pre-defined settings of the input management system which causes display or non-display of certain input type interfaces. For example, in an office environment, all types of input are made available to users such that the displayed user interface is that of FIG. 6. On the other hand, in a vehicle environment, the input management system or the device hosting the system which is incorporated in a control system of the vehicle, for example, may cause, through the display or non-display of the keyboard on the input interface and/or warning messages to the user, one set of input types to be available when the vehicle is stationary and a different set of input types to be available when the vehicle is moving.

For example, while stationary all of key typing, stroke-typing and handwriting may be used since users are able to fully concentrate on the input interface. Accordingly, the multi-modal panel 600 is displayed. Whereas, while moving handwriting only may be used since users are unable to concentrate on the input interface for typing but can still perform handwriting. This is particularly the case for superimposed handwriting in which case the input management system 112 includes a configuration such as described in U.S. Patent Publication Nos. 2015/0286886 and 2015/0356360 filed in the name of the present Applicant and Assignee, the entire contents of which is incorporated by reference herein. Accordingly, the handwriting panel 500 is displayed.

The input of content via the input area 300 may cause the rendered display of the content elsewhere on the display 102, such as a component of an active application of the computing device 100, for example. In the present system and method the input management system 112 causes display of the input content either directly or via communication of the input to the active application and/or operating system 110, for example, in a manner similar to that conventionally employed by operating systems and components and applications thereof. That is, for typing input the content is rendered as digital objects and for handwriting input the content is rendered in digital ink or as digital objects. The displayed content is content which has been recognized and interpreted by the input recognition system 113, whether the input is handwriting using the handwriting panel 500 or multi-modal panel 600, or key or stroke typing using the keyboard panel 400 or multi-modal panel 600, for example. As such, the present system and method may produce the interpreted content as ink objects.

Ink objects include links between the rendered display of digital ink, e.g., for handwriting, or 'typeset ink', e.g., fontified text, and the recognition candidates produced by the recognition processing, so that the displayed content is provided as interactive ink. This may be achieved as described in U.S. patent application Ser. No. 15/083,195 titled "System and Method for Digital Ink Interactivity" filed claiming a priority date of 7 Jan. 2016 in the name of the present Applicant and Assignee, the entire contents of which is incorporated by reference herein.

To achieve this, the input management system 112 is configured to detect the input of typing and handwriting at the input area 300 and cause the input content (or commands) to be recognized by the input recognition system 113 under control of the processor 106, for example. The input recognition system 113 and any of its components, with support and compliance capabilities, may be a source program, executable program (object code), script, application, or any other entity having a set of instructions to be performed. When a source program, the program needs to be translated via a compiler, assembler, interpreter, or the like, which may or may not be included within the memory 108, so as to operate properly in connection with the operating system 110.

Furthermore, the input recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, Python, C# and Ada; or (c) functional programing languages for example but no limited to Hope, Rex, Common Lisp, Scheme, Clojure, Racket, Erlang, OCaml, Haskell, Prolog, and F#.

Alternatively, the input recognition system 113 may be a method or system for communication with an input recognition system remote from the device, such as server or cloud-based system, but is remotely accessible by the computing device 100 through communications links using the afore-mentioned communications I/O devices of the computing device 100. Further, the input management system 112 and the input recognition system 113 may operate together or be combined as a single system.

Figure 7:
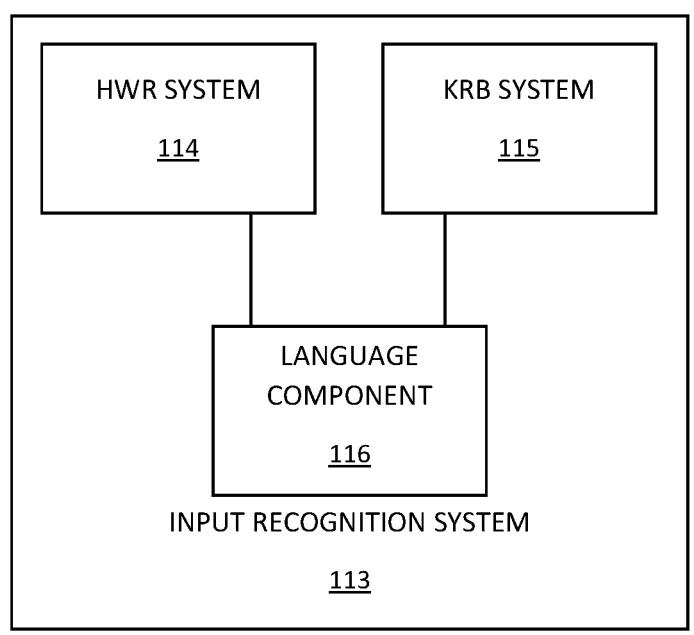
FIG. 7 shows a block diagram of a system for input recognition in accordance with an example of the present system and method.

FIG. 7 is a schematic pictorial of an example of the input recognition system 113, in either its local (i.e., loaded on the device 100) or remote (i.e., remotely accessible by the device 100) forms. The input recognition system 113 includes a handwriting recognition (HWR) system 114 as a first component and a keyboard recognition (KBR) system 115 as a second component. Each of these components utilize a language component 116 (described in detail later). In an alternative example, the input recognition system 113 may represent a single recognition system for both handwriting and keyboard input utilizing the language component 116.

With respect to handwriting input, strokes entered on or via the input interface 104 are processed by the processor 106 and routed to the HWR system 114 for recognition processing. Because different users may naturally write the same object, e.g., a letter, a shape, a symbol, with slight variations, the HWR system 114 accommodates a variety of ways in which each object may be entered whilst being recognized as the correct or intended object. With respect to typing input, sequences of points entered on or via the input interface 104 are processed by the processor 106 and routed to the KBR system 115 for recognition processing. Because different users may naturally type the same text with slight variations, particularly stroke typing, the KBR system 115 accommodates a variety of ways in which each object may be entered whilst being detected as the correct or intended object.

Figure 8:
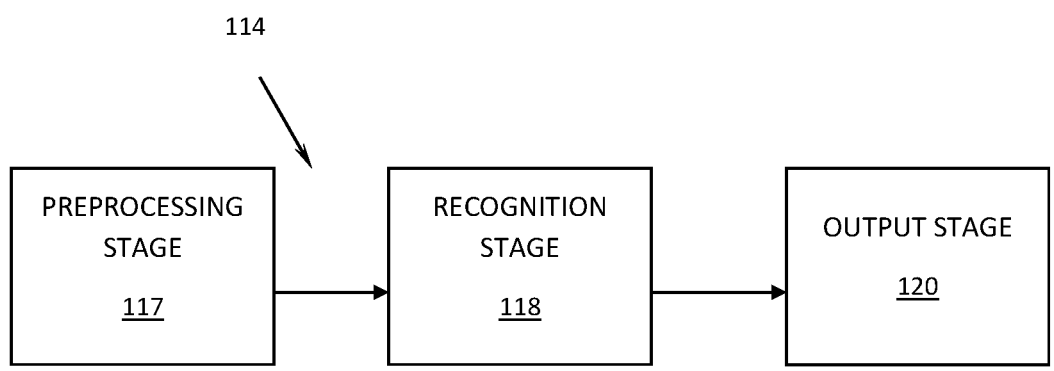
FIG. 8 shows a block diagram of a system for handwriting input recognition in accordance with an example of the present system and method.

FIG. 8 is a schematic pictorial of an example of the HWR system 114. The HWR system 114 includes stages such as preprocessing 117, recognition 118 and output 120.

The preprocessing stage 117 processes the handwriting input signal ('raw' ink) to achieve greater accuracy and reduced processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. It is understood that the preprocessing stage may be provided to the input recognition system 113 by another source, such as an optical character recognizer. Further, it is understood that the preprocessing stage may not be employed by the input recognition system 113 if the handwriting input signal is capable of being recognition processed without such preprocessing.

Figure 9:
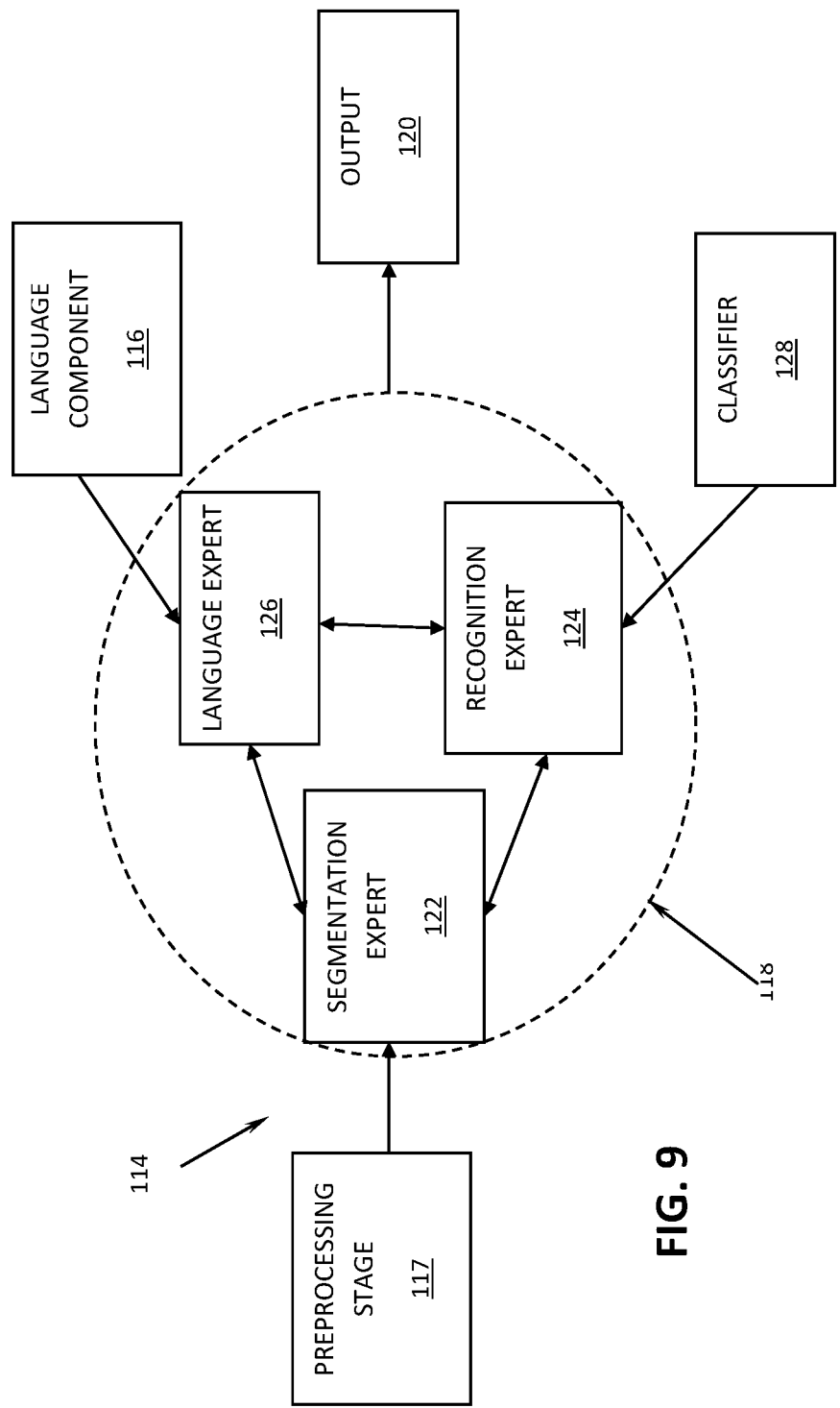
FIG. 9 shows a block diagram illustrating detail of the handwriting input recognition system of FIG. 8 in accordance with an example of the present system and method.

The recognition stage 118 may include different processing elements or experts. FIG. 9 is a schematic pictorial of the example of FIG. 8 showing schematic detail of the recognition stage 118. Three experts, a segmentation expert 122, a recognition expert 124, and a language expert 126, are illustrated which collaborate through dynamic programming to generate the output 120.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, equations, and music notation.

The recognition expert 124 provides classification of the features extracted by a classifier 128 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task. In the present system and method the classifier 128 incorporates information related to characteristics of handwritten characters, such as shape, slant, etc. which assists the recognition stage 118 in recognizing characters of candidates suggested by the other experts.

The language expert 126 generates linguistic meaning for the different paths in the segmentation graph using language models (e.g., grammar, semantics) of a linguistic resource. The expert 126 checks the candidates suggested by the other experts according to linguistic information provided by the language component 116. The linguistic information can include a lexicon, regular expressions, etc. and is the storage for all static data used by the language expert 126 to execute a language model. Example possible language models in accordance with the present system and method are described in detail later. At this point however, it is described that a language model can rely on statistical information, such as finite state automaton (FSA), on one or more given languages. The linguistic information is substantially computed off-line, with or without adaption according to the results of recognition and user interactions, and provided to the language expert 126.

The language expert 126 aims at finding the best recognition path. In one example, the language expert 126 does this by exploring the language model representing the content of linguistic information. In addition to the lexicon constraint, the language expert 126 may use a language model with statistical information modeling for how frequent a given sequence of elements appears in the specified language or is used by a specific user to evaluate the linguistic likelihood of the interpretation of a given path of the segmentation graph.

After recognition processing, the recognized objects are provided as the output 120 to the input management system 112. The input management system 112 may then render the output 120 on the display 102 as described earlier, including being included in a list of likely content candidates.

Figure 10:
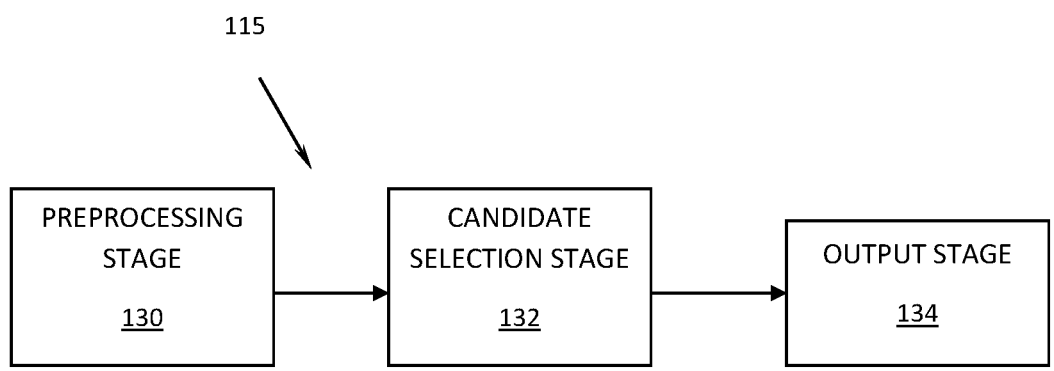
FIG. 10 shows a block diagram of a system for typing input recognition in accordance with an example of the present system and method.

FIG. 10 is a schematic pictorial of an example of the KBR system 115. The KBR system 115 includes stages such as preprocessing 130, candidate selection 132 and output 134. These stages process the detected typing points in relation to the keyboard layout being used.

The preprocessing stage 130 processes the typing input signal (typed ink) to achieve greater accuracy and reducing processing time during the candidate selection stage 132. This preprocessing may include re-sampling/normalizing (using a background layout), smoothing, clustering of points. The preprocessed sequences are then passed to the candidate selection stage 132. It is understood that the preprocessing stage may be provided to the input recognition system 113 by another source, such as an optical character recognizer. Further, it is understood that the preprocessing stage may not be employed by the input recognition system 113 if the keyboard input signal is capable of being recognition processed without such preprocessing.

Figure 11:
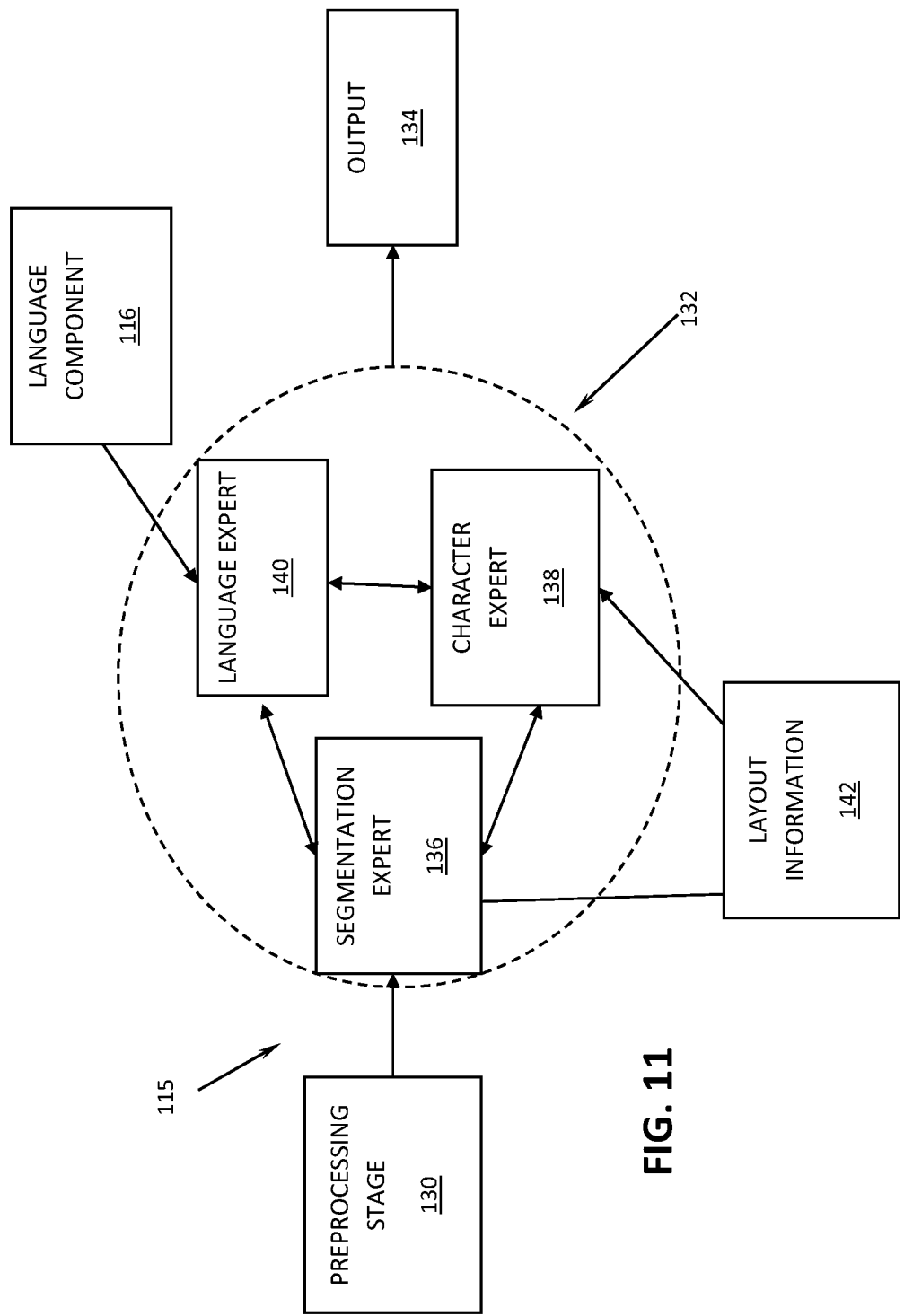
FIG. 11 shows a block diagram illustrating detail of the typing input recognition system of FIG. 10 in accordance with an example of the present system and method.

The candidate selection stage 132 may include different processing elements or experts. FIG. 11 is a schematic pictorial of the example of FIG. 10 showing schematic detail of the candidate selection stage 132. Three experts, a segmentation expert 136, a character expert 138, and a language expert 140, are illustrated which collaborate through dynamic programming to generate the output 134.

The segmentation expert 136 defines the different ways to segment the input signals into individual element hypotheses which form sequences of elements as a segmentation graph in accordance with layout information 142. For single-point interactions with the keyboard panel 400 (e.g., key typing) the element hypotheses are formed in sequences of mandatory points, whereas for multi-point interactions with the keyboard panel 400 (e.g., stroke typing) the element hypotheses are formed as re-sampled sequences of optional points, e.g., the segmentation expert 136 forms hypotheses by allowing keys (e.g., characters) to be skipped on a continuous path.

The layout information 142 is provided to, or determined by, the KBR system 115 from a plurality of possible keyboard layouts that could be displayed as stored in the memory 108 of the digital device 100, for example. Accordingly, the keyboard layout which is being interacted with in the input panel 400 or 600 is known, and therefore the relative positions of the detected points in the input panel 400 or 600 are mapped to the keys 402 and/or 404 as keystrokes.

Further, because a virtual keyboard does not have physical 'keys' and/or the size of the device display 102 may limit the size of the keys within the keyboard layout and the spacing therebetween, it is possible that users will strike more than one key substantially simultaneously when key typing, strike the wrong key when key typing or stroke-over wrong keys or miss keys when stroke typing. Such multiple keystrokes make interpretation of the intended key 'press' or stroke-over uncertain.

Thus, from the mapping, the KBR system 115 may also determine the keys 402/404 which neighbor the detected points. Accordingly, in an example of the present system and method the segmentation graph is produced with paths having nodes according to element hypotheses produced for each or some of these neighboring keys as well (thereby implementing so-called 'fuzzy' logic).

The character expert 138 provides probability scores for characters according to the input signal and the layout information 142 and outputs a list of element candidates with probabilities or scores for each node of the segmentation graph. The layout information 142 also provides the characters or commands (such as, keyboard layout change, menu launching and editing operations on the displayed recognized content, for example) assigned to each of the keys 402/404. Thus, from the layout-to-point mapping, the KBR system 115 determines the character(s) or functions corresponding to the keys 402/404 determined as the nodes of the segmentation graph.

Keyboard layout change may be provided by interaction with the input panel 400 such as input of a multiple-point gesture, like swiping, in order to 'reveal' display of different keyboard layouts. Further, a keyboard layout may provide access to alternates of the displayed character keys, such as accents, upper/lower case, language changes, symbols, numbers, etc., through multiple interactions or long-press or pressure interactions with single keys, particularly on reduced size keyboard layouts having limited keys displayed.

As such, the character expert 138 adjusts the probability scores for these 'fuzzy' points and adds character alternates based on surrounding keys of the layout, keys that may or may not be skipped for stroke typing, and/or for those not directly accessible through the displayed layout (e.g., accented variants of characters, like é, è, ê for e). This can be done for all detected points, e.g., for all element hypotheses representing all nodes of the segmentation graph, or for only those points that are considered 'fuzzy', e.g., the detected point is far from the center of a key.

The language expert 140 generates linguistic meaning for the different paths in the segmentation graph using language models (e.g., grammar, semantics) of the linguistic resource. The expert 140 checks the candidates suggested by the other experts according to linguistic information provided by the language component 116. The linguistic information can include a lexicon, regular expressions, etc., and is the storage for all static data used by the language expert 140 to execute a language model. Example possible language models in accordance with the present system and method are described in detail later. At this point however, it is described that a language model can rely on statistical information, such as finite state automaton (FSA), on one or more given languages. The linguistic information is substantially computed off-line, with or without adaption according to the results of recognition and user interactions, and provided to the language expert 140.

The language expert 140 aims at finding the best recognition path. In one example, the language expert 140 does this by exploring the language model representing the content of linguistic information. In addition to the lexicon constraint, the language expert 140 may use a language model with statistical information modeling for how frequent a given sequence of elements appears in the specified language or is used by a specific user to evaluate the linguistic likelihood of the interpretation of a given path of the segmentation graph.

After recognition processing, the selected content is provided as the output 134 to the input management system 112. The input management system 112 may then render the output 120 on the display 102 as described earlier, including being included in a list of likely content candidates.

It can be seen from the above that in the present system and method the language component 116 for the language models used by the HWR and KBR systems is shared. The language component 116 is configured as the linguistic resource for both typing and handwriting recognition. As discussed earlier, this configuration is made in such as a way as to provide a balance between the needs of the types of recognition processing and the size of the linguistic resource. This balance is provided by taking into consideration several factors related to multi-modal input interpretation.

That is, the Applicant has found that in adapting a language model used for handwriting recognition to support recognition of keyboard input, stress is placed on the language model. This is because, unlike in handwriting recognition in which the recognition rate is typically of most importance, for keyboard recognition there is a strong need for (word) completion and (word) prediction capabilities.

As an accuracy factor of HWR, the recognition rate is the rate of accurate recognition of handwritten input and may be measured as the word recognition rate (WRR) with respect to HWR using language models employing a grammatical and/or semantic linguistic resource(s).

As an accuracy factor of KBR, word completion is a mechanism of keyboard input prediction processing in which one or more remaining characters (e.g., letters) of partially typed words are predicted in order to finish the words without further typing. The efficacy of correctly completed words may be measured as the word completion rate (WCR).

As an accuracy factor of KBR, word prediction is a mechanism of keyboard input prediction processing in which at least the next word or character (e.g., grammatical mark) after a fully input or completed word is predicted, typically based on what has been typed so far. The efficacy of correctly predicted words may be measured as the word prediction rate (WPR).

The combination of completion and prediction serves to maximize the possible reduction in keystrokes. As an accuracy factor of KBR, the efficacy of this combination may be measured as the keystroke saving rate (KSR). For reasonably simple languages the KSR is substantially provided as a combination of the WCR and WPR, with any suitable weightings applied. For more complex languages, such as those having many affixes (e.g., Finnish, Korean) or ideograms (e.g., Chinese, Japanese), full word completion may not be performed as it is beneficial to predict parts of words (morphemes) thereby saving characters, so-called partial matching. Accordingly, the KSR may defined without strict adherence to the WCR and WPR.

A linguistic resource for providing maximum levels of KSR and/or WPR is typically configured differently than a linguistic resource for providing maximum levels of WRR. Thus, when adapting a well-configured HWR linguistic resource for use with KBR, for example, it is possible that an acceptable level of WRR is undesirably sacrificed in order to obtain acceptable levels of WPR and KSR (and WCR), or vice-versa when adapting a KBR linguistic resource for HWR. This may not be such a problem where the size of the linguistic resource is unimportant, since in such a case the resource can be essentially built as collocated resources with adaption, for example. However, even if storage space is not an issue such a large resource may cause relatively slower processing speeds, such that a truly unified linguistic resource is more desirable. Further, with respect to multi-modal input, a unified resource also provides a unified user experience when switching between input modes, for example, since the recognition processing is aligned.

A linguistic resource is an archive generally incorporating several resource elements including:
 a substantially exhaustive list of words in a target or main language (e.g., English) as a primary language model, called a (primary) lexicon (first element). The lexicon is built from large amounts of text, called corpora. Different corpora are built from different sources of content, such as world wide web content, internet search result content, online or offline news content, encyclopedic content, messaging content, such as SMS, email, TWITTER®, a probabilistic model associating a number (likelihood) to every possible sequence of words (second element). To do this, a sequence of words is decomposed into sequences of n words, so that it is only necessary to store in the language model probabilities associated with the sequences of the n words, called n-grams (n is an integer number). These are computed from the sequences of n words read from the corpora. The words themselves may also be classified into classes, if desired, a reduced language model of one or more different languages as a secondary language model, called a secondary lexicon (third element). For example, if the main primary language is not English, a secondary language of English may be desired, since many 'common' English terms and phrases are used in non-English languages, and various modules, called data format (fourth element), to recognize expressions that cannot be found exhaustively in the available corpora. There are typically three types of such data format modules:

a. numerical expressions, such as measurements, dates, times,
b. lexical expressions, such as person or place names, and
c. fixed form expressions, such as email addresses, URLs, hashtags.

With respect to handwriting recognition, the Applicant has found that classed-based n-gram models combined with neural networks perform rather well in terms of recognition accuracy, e.g., WRR (see, for example, Perraud, F., Viard-Gaudin, C., Morin, E., and Lallican, P.-M. (2003), N-Gram and N-Class Models for On Line Handwriting Recognition, *Seventh International Conference on Document Analysis and Recognition (ICDAR'03)*, pp. 1053-1057). Roughly speaking, the reason why this works well is because the N-class (N is an integer) narrows down the list of possible outputs from the whole dictionary (lexicon) to a relatively small group of words inside one or several classes. The classes are typically defined based on context (e.g., days of the week, words designating relations to time, verbs). Then, using the characteristics of handwritten characters, such as letter shape mentioned earlier, the neural networks are able to determine suitable character and word candidates inside the few selected classes.

Accordingly, in terms of WRR it is desirable to use N-class models combined with n-gram models and a means of applying characteristics of handwriting (e.g., neural networks) to guide the recognition using the language model. This is because the combined language model of the N-class and n-gram models provides a first processing to reduce the number of possible words searched in the linguistic resource, e.g., the lexicon, and the handwriting model provides a second or corrective processing to hone the first processing if the correct candidates are not initially found.

Classed-based n-gram language models are useful in HWR particularly due to the stroke segmentation used which basically provides prefixes for determining which classes of the N-class model are most suitable for recognition processing by considering better stroke sequences from the characteristics of the handwritten strokes. On the other hand, since typing input from a keyboard does not include characteristics like handwriting, the same corrective mechanisms may not be used. Thus, classed-based n-gram language models are not conventionally used for recognizing and interpreting keyboard input.

The Applicant has found however that in the present system and method in which both handwriting and keyboard input is to be recognized there are parameters of classed-based n-gram language models which are useful for recognition of keyboard input while providing a linguistic resource having a constrained size. However, it is necessary to configure the linguistic resource to take both types of recognition into account.

In order to provide a linguistic resource having a predefined size (e.g., about five Mb), it is possible to individually select the parameters of the elements making up the resource. These resource parameters are related to:

the size of the lexicon (first parameter),
the corpora content (second parameter) used to build the lexicon and the n-gram model,
the number of sequences (n-grams) taken into account inside the language model (third parameter),
the order of the n-gram model, e.g., the value of n (fourth parameter), and
the number of classes in the N-class model, e.g., the value of N (fifth parameter).

One of ordinary skill in the art understands the terms "n-gram", "N-class" and the model "order", in terms of language models.

The size of the lexicon may be selected, for example, by keeping only words present more than k times in the corpora (word frequency) used to build the lexicon (k is an integer). Additionally, or alternatively, it is possible to select words that appear in more than k documents (document frequency) or in more than k corpora (corpus frequency).

The content of the lexicon and the n-gram model may be selected by the corpora used to build these.

The number of sequences may be selected by setting a threshold (e.g., based on the primary language and document type being recognition processed) below which sequences are ignored. The sequence number threshold may be set, for example, by interpolation from cut-offs set on the largest corpus (e.g., Web search or news content) or set corpus-by-corpus (e.g., news content corpora, encyclopedic content corpora, messaging content corpora). In this way one corpus may be favored over another or others. Additionally, weighting may be applied to different corpora in building the language model.

It is also possible to set parameters related to the data format modules. However, since the sizes of these modules relate to the number of regular expressions included they occupy a much smaller size in the linguistic resource. Similarly, the relative size of the secondary lexicon (or lexica) is typically small, and therefore may not require adjustment.

The Applicant has found that the settings of each of these resource parameters impacts each of the WRR, WPR and KSR (and WCR) in an individual manner. In particular, some resources of the linguistic information are more suitable for handwriting recognition while others are more suitable for keystroke prediction.

The size of the lexicon (first parameter) mostly impacts the accuracy of the character/word recognition in HWR (e.g., the WRR). This is because, to a certain extent, a larger lexicon allows more words to be recognized.

An impact of the lexicon size is also observable on the word completion and prediction accuracy in KBR (e.g., the WCR, WPR and KSR), however the content of the lexicon and the n-gram model (second parameter) has a more substantial impact on the WCR, WPR and KSR, and certainly more so than for the WRR of HWR. This is because utilizing more content from more corpora provides a larger lexicon, and therefore a larger n-gram model, which is beneficial for HWR. Whereas, for word completion and prediction it is beneficial to only use corpora that are similar to the style of the input content to be recognized, e.g., messaging corpora should be used when messaging input is to be recognized and corpora from other sources, like news and encyclopedic, should be omitted. This selective incorporation of corpora reduces noise and prediction conflicts.

Accordingly, a balance between the first and second linguistic resource parameters within the constraints of the resource size allows some optimization of accuracy factors of both HWR and KBR.

The number of sequences being kept to build the language model (third parameter) impacts both character/word recognition in HWR (e.g., the WRR) and word completion and prediction in KBR (e.g., the WCR, WPR and KSR) similarly and substantially equally. That is, the values of the WRR, WCR, WPR and KSR change in a similar way and by similar magnitude.

Accordingly, the third linguistic resource parameter may be used to adjust the final size of the linguistic resource to within the pre-defined or determined constraints once optimization using the other parameters has been performed.

The relative settings of the order of the n-gram model (fourth parameter) and the number of classes in the N-class model (fifth parameter), mostly impact the accuracy of word prediction in KBR (e.g., the WPR), with some relative impact on the keystroke saving rate also (e.g., the KSR). That is, it has been found that for class-based n-gram models used in keyboard input recognition, having a combination of a higher order of the n-gram model (e.g., n=3 rather than n=2) with a lower number of classes of the N-class model (e.g., N=256 rather than N=1024 or 2048) increases the WPR in particular. On the other hand, with respect to the accuracy of the character/word recognition in HWR (e.g., the WRR), for a linguistic resource having a constrained size it has been found that a higher number of classes of the N-class model is more beneficial to the WRR than increasing the order of the n-gram model.

This is possibly because a lower number of classes increases the number of words in each class that are classified from the corpora used, and vice-versa for a higher number of classes. Having less words in each class is not problematic for HWR since the characteristics of the handwriting may be used as described earlier to adjust for any deficiencies, whereas for word prediction in KBR having more words in each class decreases the accuracy of prediction. Similarly, the length (e.g., order) of the n-gram sequences is not problematic for HWR since the characteristics of the handwriting may be used as described earlier to adjust for any deficiencies, whereas for word prediction in KBR having more words acting as prefixes for the next predicted word increases the accuracy of prediction.

With respect to word completion accuracy in KBR (e.g., the WCR), the impact of the fourth and fifth parameters appears similar to that of HWR. This is because the initially input characters of the words act as prefixes for determining which classes of the N-class model are most suitable for recognition processing. In this way, a corrective mechanism similar to the handwriting characteristics is provided.

With respect to KBR for stroke typing, it is possible that stroke typing can be considered to have stroke-based characteristics similar to handwriting, and therefore the impacts of adjusting the parameters on the WCR, WPR and KSR may be similar to that for the WRR. However, unlike handwriting which is generally well-defined at least within a certain language or populace, there is little known definition as to how users perform stroke typing.

Accordingly, when the linguistic information is to be shared by the handwriting and keyboard recognizers and desirably has a pre-determined (e.g., substantially constant) size in accordance with the application, it is necessary to determine the values related to the resource parameters which optimizes all of the WRR, WPR and KSR (and WCR) when building the linguistic information 116.

It has been found by the Applicant that the afore-described impacts are different in magnitude or effect for different primary (and secondary) languages and different input content recognition, such as text (SMS) message content, email message content, document content, etc. It is possible however to configure the linguistic resource 116 of the input recognition system 113 so that an average size of the linguistic resource within the pre-determined constraint is provided for the input recognition system 113.

In one example, the fourth and/or fifth linguistic resource parameters are adjusted so that acceptable optimized values of the WRR and WPR (and KSR) are relatively achieved while the average size of the linguistic resource is as close as possible to the desired size (e.g., not substantially above or below 5 Mb), then the first and second linguistic resource parameters are adjusted so that acceptable optimized values of all of the WRR, WPR and KSR (and WCR) are relatively maintained or achieved while the average size of the linguistic resource remains as close as possible to the desired size (e.g., not substantially above or below 5 Mb), and then the third parameter is adjusted up or down to substantially achieve the desired average size, as described earlier.

For the present system and method the setting of the parameters of the linguistic resource may be performed during the building of the linguistic information 116 prior to deploying the input management system 112 (and the input recognition system 113) to the digital device 100. In such case, one or more corpora are chosen, for example based on the application of input, and the lexicon/lexica is built accordingly to provide the desired resource size. Alternatively, or additionally, the linguistic resource may be dynamically built through continual updating of the linguistic information 116 by augmenting or adding to the existing corpora. Alternatively, or additionally, the linguistic resource may be redefined through replacement of the linguistic information 116 for example based on a new application of input. Further, the input management system 112 may prompt developers and/or end users, for example by suitable messaging, to initiate or cause such updating using the digital device 100.

The present system and method provides recognition and interpretation of multi-modal input which optimizes the handwriting recognition rate, the keyboard word prediction rate and the keystroke saving rate with a unified linguistic resources having a relatively small footprint. In this way, resources representative of a language that allow state-of-the art performances in recognition, completion and prediction are obtained in a multi-modal input system and method which exhibits substantially similar behavior in all modes, or for all types, of input for all input recognition features considered for the linguistic techniques used. The present system and method is also applicable to pure handwriting and keyboard recognition contexts, in which improved prediction abilities are also desirable.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for providing a linguistic resource for input recognition of multiple input types to computing devices, each computing device comprising a processor and a memory storing instructions that, when executed by the processor, causes the processor to:
provide, via the memory of the computing device, a set of a plurality of parameters of a language model to a unified linguistic resource of one or more languages;
receive, via an input area of an input interface of the computing device, a content of multiple input types, wherein the multiple input types include at least handwriting input and typing input; and
recognize, via the unified linguistic resource, the received content of multiple input types based on the setting of the plurality of parameters and a pre-determined size of the unified linguistic resource,
wherein the recognition of the received content of multiple input types includes performance characteristics, the performance characteristics consisting of at least a word recognition rate of the handwriting input, a word prediction rate of the typing input, and a keystroke saving rate of the typing input,
wherein the language model is a class-based n-gram model utilizing a lexicon built using one or more corpora related to the one or more languages,
wherein the set of the plurality of parameters includes (i) a first parameter related to a size of the lexicon and (ii) a second parameter related to corpora content used to build the lexicon and the n-gram model, and
wherein in order to optimize the performance characteristics by maximizing at least the word recognition rate and the keystroke saving rate, (i) the first parameter is set such that the size of the lexicon is selected based on a word frequency in the one or more corpora and further based on the pre-determined size of the unified linguistic resource and (ii) the second parameter is set such that the corpora content used to build the lexicon and the n-gram model is selected based on the corpora used to build the lexicon and the n-gram model and further based on the pre-determined size of the unified linguistic resource.

2. The system according to claim 1, wherein:
the set of the plurality of parameters further include one or more of a third parameter related to the number of n-gram sequences, a fourth parameter related to the order of the n-gram model, and a fifth parameter related to the number of classes in the class-based model.

3. The system according to claim 2, wherein the fourth and fifth parameters are set to adjust the word prediction rate of the typing input to increase the performance characteristics.

4. The system according to claim 3, wherein the first parameter is set to adjust the word recognition rate to increase the performance characteristics, the second parameter is set to adjust the word prediction and keystroke saving rates of the typing input to increase the performance characteristics, and the third parameter is set to provide the unified linguistic resource with said pre-determined size once the performance characteristics have been increased.

5. A method for providing a linguistic resource for input recognition of multiple input types to computing devices, each computing device comprising a processor and at least one non-transitory computer readable medium for recognizing input under control of the processor, the method comprising:
providing, via a memory of a computing device, a set of a plurality of parameters of a language model to a unified linguistic resource of one or more languages;
receiving, via an input area of the computing device, a content of multiple input types, wherein the multiple input types include at least handwriting input and typing input; and
recognizing, via the unified linguistic resource, the received content of multiple input types received at the input area of an input interface of the computing device, wherein the recognition of the received content is based on the setting of the plurality of parameters and a pre-determined size of the unified linguistic resource,
wherein the recognition of the received content of multiple input types includes performance characteristics, the performance characteristics consisting of at least a word recognition rate of the handwriting input, a word prediction rate of the typing input, and a keystroke saving rate of the typing input,
wherein the language model is a class-based n-gram model utilizing a lexicon built using one or more corpora related to said one or more languages,
wherein the set of the plurality of parameters includes (i) a first parameter related to a size of the lexicon and (ii) a second parameter related to corpora content used to build the lexicon and the n-gram model, and
wherein in order to optimize the performance characteristics by maximizing at least the word recognition rate and the keystroke saving rate, (i) the first parameter is set such that the size of the lexicon is selected based on a word frequency in the one or more corpora and further based on the pre-determined size of the unified linguistic resource and (ii) the second parameter is set such that the corpora content used to build the lexicon and the n-gram model is selected based on the corpora used to build the lexicon and the n-gram model and further based on the pre-determined size of the unified linguistic resource.

6. The method according to claim 5, wherein:
the set of the plurality of parameters further include one or more of a third parameter related to the number of n-gram sequences, a fourth parameter related to the order of the n-gram model, and a fifth parameter related to the number of classes in the class-based model.

7. The method according to claim 6, wherein the fourth and fifth parameters are set to adjust the word prediction rate of the typing input.

8. The method according to claim 7, wherein the first parameter is set adjust the word recognition rate to increase the performance characteristics, the second parameter is set to adjust the word prediction and keystroke saving rates of the typing input to increase the performance characteristics, and the third parameter is set to provide the unified linguistic resource with said pre-determined size once the performance characteristics have been increased.

9. A non-transitory computer readable medium having a computer readable program code embodied therein, said computer readable program code adapted to be executed to implement a method for providing a linguistic resource for input recognition of multiple input types to a computing device, the computing device comprising a processor and at least one system non-transitory computer readable medium for recognizing input under control of the processor, the method comprising:
   providing, via a memory of a computing device, a set of a plurality of parameters of a language model to a unified linguistic resource of one or more languages;
   receiving, via an input area of the computing device, a content of multiple input types, wherein the multiple input types include at least handwriting input and typing input; and
   recognizing, via the unified linguistic resource, the received content of multiple input types received at the input area of an input interface of the computing device, wherein the recognition of the received content is based on the setting of the plurality of parameters and a pre-determined size of the unified linguistic resource,
   wherein the recognition of the received content of multiple input types includes performance characteristics, the performance characteristics consisting of at least a word recognition rate of the handwriting input, a word prediction rate of the typing input, and a keystroke saving rate of the typing input,
   wherein the language model is a class-based n-gram model utilizing a lexicon built using one or more corpora related to said one or more languages,
   wherein the set of the plurality of parameters includes (i) a first parameter related to a size of the lexicon and (ii) a second parameter related to corpora content used to build the lexicon and the n-gram model, and
   wherein in order to optimize the performance characteristics by maximizing at least the word recognition rate and the keystroke saving rate, (i) the first parameter is set such that the size of the lexicon is selected based on a word frequency in the one or more corpora and further based on the pre-determined size of the unified linguistic resource and (ii) the second parameter is set such that the corpora content used to build the lexicon and the n-gram model is selected based on the corpora used to build the lexicon and the n-gram model and further based on the pre-determined size of the unified linguistic resource.

10. The non-transitory computer readable medium according to claim 9, wherein:
    the set of the plurality of parameters further include one or more of a third parameter related to the number of n-gram sequences, a fourth parameter related to the order of the n-gram model, and a fifth parameter related to the number of classes in the class-based model.

11. The non-transitory computer readable medium according to claim 10, wherein the fourth and fifth parameters are set to adjust the word prediction rate of the typing input.

12. The non-transitory computer readable medium according to claim 11, wherein the first parameter is set to adjust the word recognition rate, the second parameter is set to adjust the word prediction and keystroke saving rates of the typing input, and the third parameter is set to provide the unified linguistic resource with said pre-determined size once the performance characteristics have been increased.

* * * * *